US012539105B2

(12) United States Patent
Trzasko et al.

(10) Patent No.: US 12,539,105 B2
(45) Date of Patent: Feb. 3, 2026

(54) SUPER-RESOLUTION MICROVESSEL IMAGING USING SEPARATED SUBSETS OF ULTRASOUND DATA

(71) Applicant: Mayo Foundation for Medical Education and Research, Rochester, MN (US)

(72) Inventors: Joshua D. Trzasko, Rochester, MN (US); Shigao Chen, Rochester, MN (US); Pengfei Song, Champaign, IL (US); Chengwu Huang, Rochester, MN (US); Armando Manduca, Rochester, MN (US); Matthew Lowerison, Champaign, IL (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 240 days.

(21) Appl. No.: 17/618,817

(22) PCT Filed: Jun. 15, 2020

(86) PCT No.: PCT/US2020/037763
§ 371 (c)(1),
(2) Date: Dec. 13, 2021

(87) PCT Pub. No.: WO2020/252463
PCT Pub. Date: Dec. 17, 2020

(65) Prior Publication Data
US 2022/0240899 A1    Aug. 4, 2022

Related U.S. Application Data

(60) Provisional application No. 62/861,580, filed on Jun. 14, 2019.

(51) Int. Cl.
*A61B 8/00* (2006.01)
*G06T 7/00* (2017.01)
*G06T 7/20* (2017.01)

(52) U.S. Cl.
CPC ............ *A61B 8/5223* (2013.01); *A61B 8/481* (2013.01); *A61B 8/488* (2013.01); *G06T 7/0012* (2013.01);
(Continued)

(58) Field of Classification Search
CPC ........... A61B 8/481; A61B 8/488; G06T 7/20; G06T 2207/10132; G06T 2207/30101
See application file for complete search history.

(56) References Cited

U.S. PATENT DOCUMENTS

| 10,247,824 B2 | 4/2019 | Park et al. |
| 11,457,890 B2 | 10/2022 | Song et al. |

(Continued)

FOREIGN PATENT DOCUMENTS

| WO | 2017146886 A1 | 8/2017 | |
| WO | WO-2018134729 A1 * | 7/2018 | ............... A61B 8/06 |
| WO | 2018222724 A1 | 12/2018 | |

OTHER PUBLICATIONS

"In Vivo Acoustic Super-Resolution and Super-Resolved Velocity Mapping Using Microbubbles" by K. Christensen-Jeffries. IEEE Trans Med Imag. vol. 34, No. 2. Feb. 2015 (Year: 2015).*

(Continued)

*Primary Examiner* — Jason M Ip
(74) *Attorney, Agent, or Firm* — Quarles & Brady LLP

(57) ABSTRACT

Super-resolution ultrasound imaging of microvessels in a subject is described. Ultrasound data are acquired from a region-of-interest in a subject who has been administered a microbubble contrast agent. The ultrasound data are acquired while the microbubbles are moving through, or (Continued)

otherwise present in, the region-of-interest. Microbubble signals are isolated from the ultrasound data and are separated into subsets of data based on properties of the microbubbles, such as spatial-temporal hemodynamics. By localizing, tracking, and accumulating the microbubbles in each subset of data, super-resolution images of the microvessels can be generated for each subset, such that each of these images represents a sparse subset of microbubble signals. These images are combined to generate a super-resolution microvessel image.

26 Claims, 14 Drawing Sheets

(52) U.S. Cl.
CPC ...... *G06T 7/20* (2013.01); *G06T 2207/10132* (2013.01); *G06T 2207/20084* (2013.01); *G06T 2207/30101* (2013.01)

(56) References Cited

U.S. PATENT DOCUMENTS

| | | |
|---|---|---|
| 11,589,840 B2 | 2/2023 | Song et al. |
| 2018/0060635 A1 | 3/2018 | Li et al. |
| 2018/0220997 A1 | 8/2018 | Song et al. |

OTHER PUBLICATIONS

Effect of Microbubble Size on Fundamental Mode High Frequency Ultrasound Imaging in Mice. by S. Sirsi et al. Ultraso Med Biol. vol. 36, No. 6. pp. 935-948. (Year: 2010).*

Bar-Zion, A., et al., "Fast Vascular Ultrasound Imaging With Enhanced Spatial Resolution and Background Rejection," IEEE Transactions on Medical Imaging (2017) vol. 36, No. 1, pp. 169-180.

Christensen-Jeffries, K., et al., "In Vivo Acoustic Super-Resolution and Super-Resolved Velocity Mapping Using Microbubbles," IEEE Transactions on Medical Imaging (2015) vol. 34, No. 2, pp. 433-440.

Dertinger, T., et al., "Fast, background-free, 3D super-resolution optical fluctuation imaging (SOFI)." Proceedings of the National Academy of Sciences (2009) 106 (52) 22287-22292.

Dertinger, T., et al., "Achieving increased resolution and more pixels with Superresolution Optical Fluctuation Imaging (SOFI)," Opt. Express (2010) 18, 18875-18885.

Errico, C., et al., "Ultrafast ultrasound localization microscopy for deep super-resolution vascular imaging" Nature (2015) 527, 499-502.

Foiret, J., et al., "Ultrasound localization microscopy to image and assess microvasculature in a rat kidney" Sci Rep (2017) 7, 13662.

Guo, W., et al., "A High-Efficiency Super-Resolution Reconstruction Method for Ultrasound Microvascular Imaging" Appl. Sci. (2018) 8, 1143.

Lin, F., et al., "3-D Ultrasound Localization Microscopy for Identifying Microvascular Morphology Features of Tumor Angiogenesis at a Resolution Beyond the Diffraction Limit of Conventional Ultrasound" Theranostics (2017) 7(1):196-204.

Lowerison, M.R., et al., "Ultrasound localization microscopy of renal tumor xenografts in chicken embryo is correlated to hypoxia" Sci Rep (2020) 10, 2478.

Song, P. et al., "Improved super-resolution Ultrasound Microvessel Imaging with Spatiotemporal Nonlocal Means Filtering and Bipartite Graph-Based Microbubble Tracking" IEEE Transactions on Ultrasonics, ferroelectrics, and frequency control (2018) vol. 65 pp. 149-167.

Yu, J., et al.,"Super-resolution ultrasound imaging method for microvasculature in vivo with a high temporal accuracy" Sci Rep (2018) 8, 13918.

International Search Report issued for PCT/US2020/037763 dated Sep. 11, 2020.

International Preliminary Report on Patentability issued for PCT/US2020/037763 dated Dec. 14, 2021.

* cited by examiner

SUPER-RESOLUTION MICROVESSEL IMAGING USING SEPARATED SUBSETS OF ULTRASOUND DATA

CROSS-REFERENCE TO RELATED APPLICATIONS

This application represents the national stage entry of PCT/US2020/037763 filed on Jun. 15, 2020 and claims the benefit of U.S. Provisional Patent Application Ser. No. 62/861,580, filed on Jun. 14, 2019, and entitled "SUPER-RESOLUTION MICROVESSEL IMAGING USING SEPARATED SUBSETS OF ULTRASOUND DATA," the contents of which is herein incorporated by reference in its entirety.

STATEMENT REGARDING FEDERALLY SPONSORED RESEARCH

This invention was made with government support under CA214523 awarded by the National Institutes of Health. The government has certain rights in the invention.

BACKGROUND

Ultrasound super-resolution microvessel imaging based on ultrasound contrast agents such as microbubbles has recently been proposed to break the diffraction limit of conventional ultrasound imaging with substantially improved spatial resolution. The basic idea of achieving super-resolution is that the position/location of spatially isolated microbubbles can be determined and used to construct blood flow images at a resolution beyond the diffraction limit. This is fundamentally different from conventional imaging where backscattered microbubble signals are used to form images, in which spatial resolution is physically limited by the wavelength of ultrasound which is hundreds of times larger than the size of the microbubbles. The implementation of ultrasound super-resolution imaging generally includes the following steps: injection of contrast agents (such as microbubbles), acquisition of ultrasound data frames for a certain period of time, and post-processing which generally includes microbubble signal extraction, localization, tracking, and reconstruction.

At present, one major challenge of super-resolution imaging is inadequate microbubble separation. Spatially isolated microbubble signals are essential for accurate microbubble localization, which is then used to form super-resolution images. When microbubbles are too close to each other, their echo signals overlap and interfere, which makes the localization of individual microbubbles inaccurate or even impossible. One method for addressing this challenge is to lower the microbubble concentration, e.g. using diluted microbubbles. However, it is also necessary to create enough isolated microbubble signals to fully populate the targeted microvasculature. Lowering the concentration will result in sparser microbubble events and significantly elongate the data acquisition time needed to reconstruct the entire vascular tree. A long acquisition time is also challenging in vivo because of tissue and operator-induced motion, which is detrimental to super-resolution imaging. The dilution method may also require constant infusion of microbubbles or multiple microbubble injections to reach the targeted dose, which is challenging in clinical settings. There is thus a fundamental tradeoff between lowering the acquisition time and obtaining a sufficient number of isolated microbubble signals.

SUMMARY OF THE DISCLOSURE

The present disclosure addresses the aforementioned drawbacks by providing a method for generating an image of microvasculature in a subject from ultrasound data. The method includes accessing ultrasound data acquired from a subject with a computer system. Microbubble signal data are generated by extracting microbubble signals from the ultrasound data using the computer system. A plurality of subsets of microbubble signal data are generated from the microbubble signal data using the computer system. The plurality of subsets of microbubble signal data are generated by separating the microbubble signal data into subsets of microbubble signals based on microbubble properties. A microvessel image is generated for each subset of microbubble signal data using the computer system, wherein each microvessel image represents a sparse subset of microbubble signals. A combined microvessel image is then generated based on a combination of the microvessel image for each of the plurality of subsets of microbubble signal data.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Described here are systems and methods for super-resolution ultrasound imaging of microvessels in a subject. Ultrasound data are acquired from a region-of-interest in a subject who has been administered a microbubble contrast agent. The ultrasound data are acquired while the microbubbles are moving through, or otherwise present in, the region-of-interest. The region-of-interest may include, for instance, microvessels or other microvasculature in the subject. By isolating, localizing, tracking, and accumulating the microbubbles in the ultrasound data, super-resolution images of the microvessels can be generated, as described in the present disclosure.

To break the tradeoff between acquisition time and microbubble concentration, the systems and methods described in the present disclosure perform microbubble separation in ultrasound images to improve the sparsity of microbubble signals. This separation improves bubble localization for more robust super-resolution imaging. It is a discovery of the present disclosure that even though microbubble signals may overlap in space and time, they can still be separable based on differences in microbubble properties or characteristics.

In one example, the microbubble signals can be separated based on the differences in spatiotemporal hemodynamic of microbubbles such as movement speed, movement direction, and decorrelation. In another example, the microbubble signals can be separated by differences in acoustical properties of individual microbubbles, such as linear or nonlinear frequency responses to the sonifying ultrasound wave. In yet another example, the microbubble signals can be separated by the combination of spatiotemporal hemodynamic and acoustic properties. As another example, the microbubble signals can be separated based on differences in microbubble size. For instance, different sized microbubbles have different resonance frequencies, which may be leveraged for bubble separation (e.g., based on bandpass or other filtering in the ultrasound receive).

This disclosure focus on extracting and detecting microbubble signal differences to separate the acquired microbubbles into several distinct subsets, which can be processed independently, and each of which has a sparser microbubble concentration than the whole. Thus, many overlapping microbubble signals can be processed that otherwise would have been discarded.

In yet another example, the microbubble signals can be separated based on artificial intelligence (AI) technologies, such as machine learning and deep learning, in which simulation or experiment microbubble data with different microbubble characteristics can be used to train the algorithms for the purpose of microbubble separation. The separation of microbubbles can therefore allow a higher concentration of microbubble injected and significantly reduce data acquisition time for super-resolution imaging, which is critical for successful clinical translation of the technique.

Figure 1:
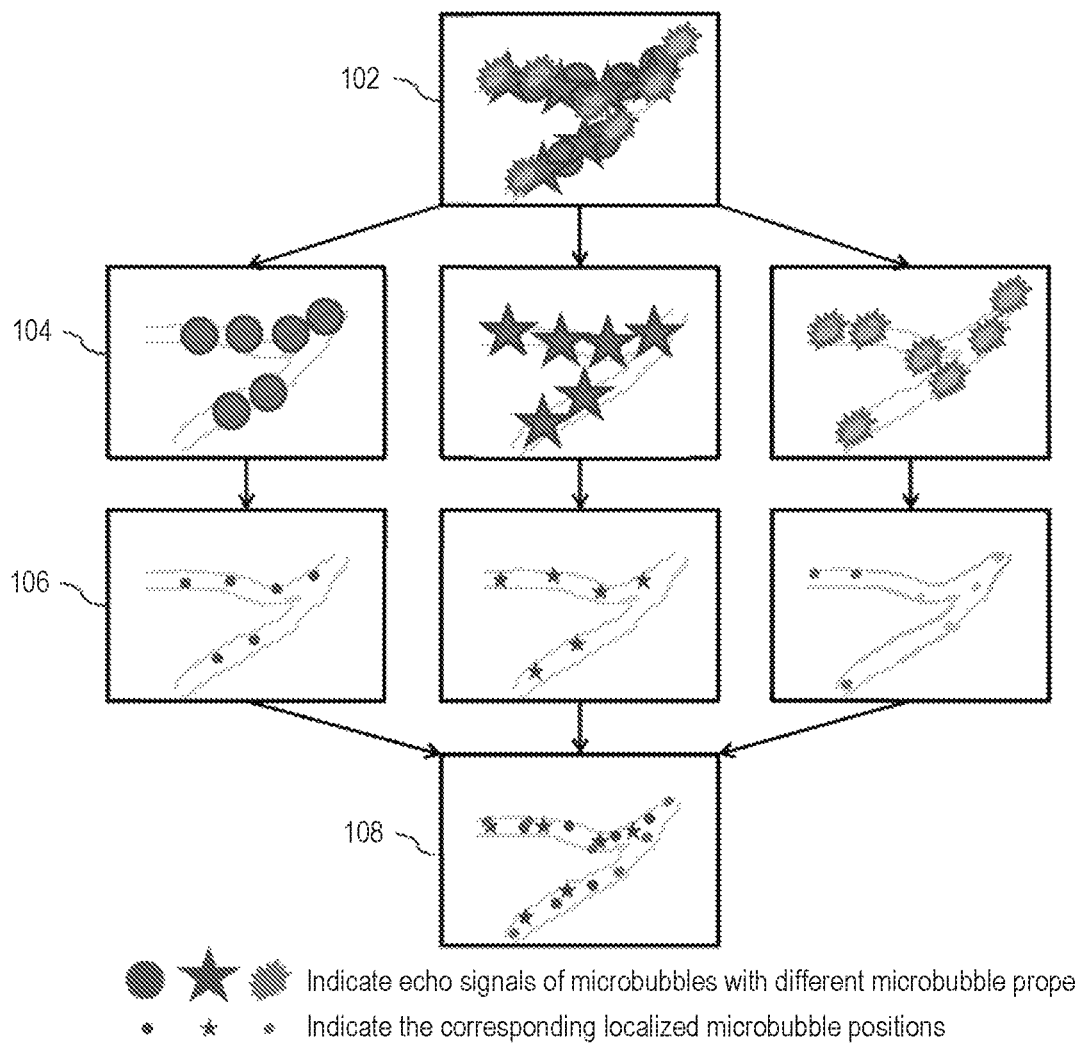
FIG. 1 illustrates an example of separating microbubble signals based on different microbubble properties.

FIG. 1 illustrates the general idea of microbubble separation for super-resolution ultrasound microvessel imaging. The echo signals of microbubbles with different properties such as spatiotemporal hemodynamic and acoustic properties are indicated with different marks and colors in FIG. 1. Unit 102 indicates the conventional vessel image formed with overlapping echo signals of microbubbles, where the spatial resolution is physically limited by the wavelength of ultrasound. By using the techniques proposed in this disclosure, microbubbles are separated into different subsets with sparser populations (unit 104). And then processing is performed for each subset of microbubble signals separately to localize the positions of spatially isolated microbubbles and retrieve the super-resolved microvessel images, as indicated by unit 106. The subset microvessel images are then combined to generate the final super-resolved image with high microbubble concentration, as indicated by unit 108. As an illustration, the original microbubbles are only separated into 3 subsets in FIG. 1. In practice, the number of subsets can be arbitrary.

Figure 2:
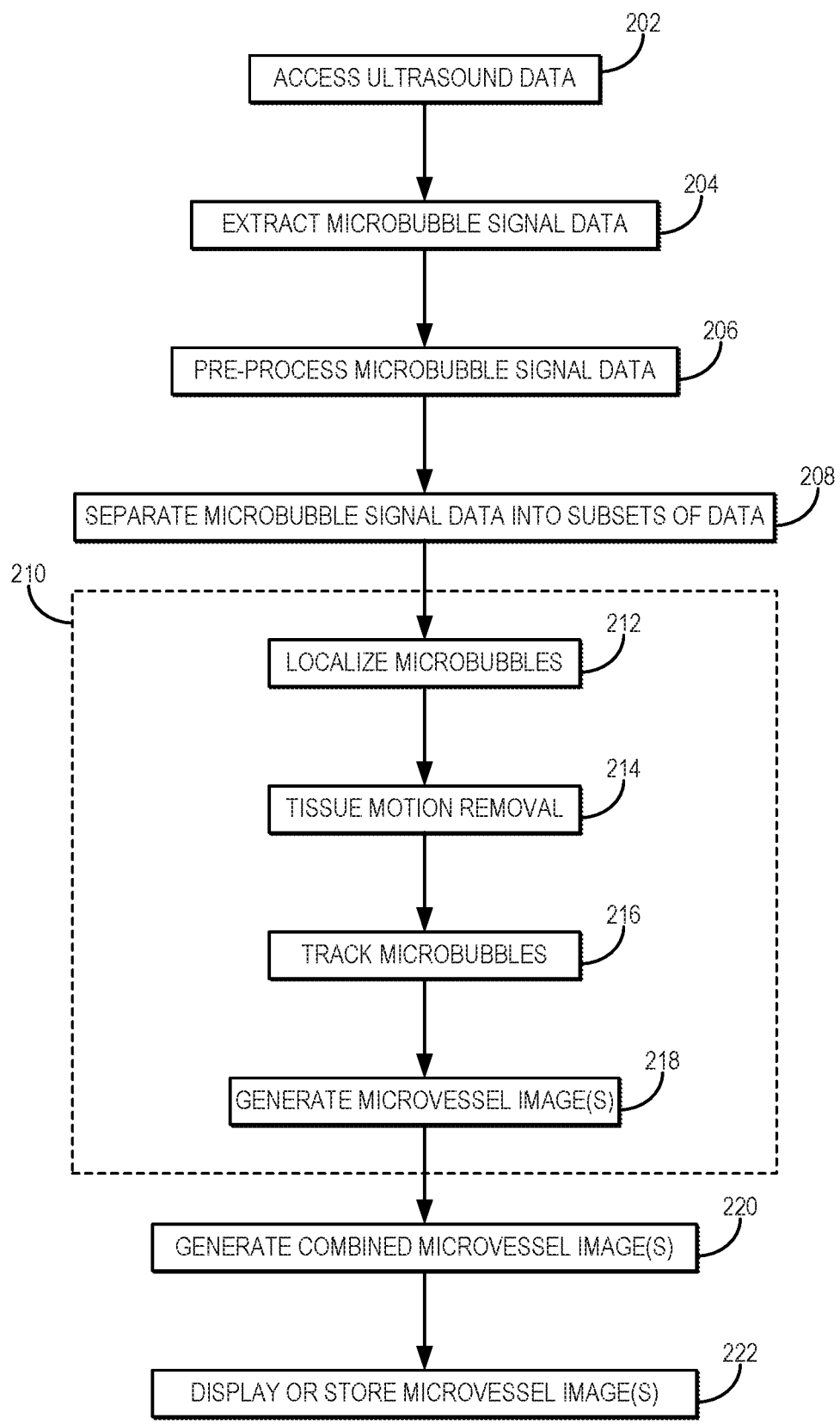
FIG. 2 is a flowchart setting forth the steps of an example method for using an ultrasound system to produce super-resolution images of microvessels in a subject who has been administered a microbubble contrast agent.

Referring now to FIG. 2, a flowchart is illustrated as setting forth the steps of an example method for using an ultrasound system to produce super-resolution images of microvessels in a subject who has been administered a microbubble contrast agent. In general, super-resolution refers to a resolution that is enhanced relative to the resolution attainable with the imaging system. For instance, super-resolution ultrasound images can refer to images with a resolution that is finer than the diffraction limit.

The method includes accessing ultrasound data with a computer system, as indicated at step 202. In some embodiments, accessing the ultrasound data with the computer system can include retrieving previously acquired ultrasound data from a memory or other data storage device or medium, which may be a part of or separate from the computer system. In some other embodiments, accessing the ultrasound data can include acquiring such data with an ultrasound system and communicating the acquired data to the computer system, which may be a part of or separate from the ultrasound system.

The ultrasound data can be acquired using any suitable detection sequence, including line-by-line scanning, compounding plane wave imaging, synthetic aperture imaging, compounding diverging beam imaging, and so on. The ultrasound data can be ultrasound radiofrequency data, ultrasound in-phase quadrature ("IQ") data, ultrasound envelope data, or the like. As an example, the ultrasound data may be 1D data, 2D data, or 3D data. In general, the ultrasound data contains one or more spatial dimensions, which may include a lateral dimension, an axial dimension, an elevational dimension, and combinations thereof. For instance, the ultrasound data can contain two spatial dimensions, such as the lateral and axial dimensions. The ultrasound data may also contain a temporal dimension, such as a dimension in slow time (i.e., the temporal direction along which multiple ultrasound signals are collected).

The microbubble signal can be obtained from both the linear and nonlinear components of the ultrasound wave. Thus, in some embodiments, data acquisition can be combined with either fundamental imaging or nonlinear imaging sequences. Examples of nonlinear imaging sequences include pulse inversion ("PI"), amplitude modulation ("AM"), and pulse inversion amplitude modulation ("PIAM"). The linear component is typically at the fundamental frequency of the applied ultrasound wave, while the nonlinear component can be at both the harmonic frequencies of the applied ultrasound wave, at the fundamental frequency of the applied ultrasound wave, at subharmonic frequencies, at ultraharmonic frequencies, or combinations thereof. For instance, the nonlinearity introduced by amplitude-modulation-base imaging methods can be at the fundamental frequency.

Microbubble signal data are generated by extracting microbubble signals from the ultrasound data, as indicated at step 204. In general, isolating the microbubbles signals includes isolating microbubble signals from the background signals, such as tissue signal and signals from non-changing microbubbles that do not change between acquisition frames (e.g., when a microbubble that does not move between frames). In some embodiments, the microbubble signals can be isolated using frame-to-frame signal subtraction, tissue clutter filtering, and so on. Tissue clutter filtering techniques can include high-pass filtering along the temporal direction of the signal, singular value decomposition ("SVD")-based filtering, regression-based filtering, eigen-based filtering, and so on.

As one example, temporal high-pass filtering can be used to isolate microbubble signals. In these implementations, a cutoff frequency that is lower than the temporal frequency of the isolated microbubble signal, but higher than that of background signal can be used to filter the ultrasound data to isolate microbubble signals.

As another example, an SVD-based filtering can be used, in which a singular value cutoff can be used to separate the background signal (e.g., the tissue signal and non-moving microbubble signal, which are typically projected to low-order singular values) from the isolated moving microbubble signals (which are typically projected to intermediate-to-high-order singular values). As one example, the block-wise adaptive SVD filter described in co-pending U.S. patent application Ser. No. 16/079,289, which is herein incorporated by reference in its entirety, can be used to implement an SVD-based filtering to extract the microbubble signals. As another example, the accelerated SVD filter described in co-pending U.S. patent application Ser. No. 15/887,029, which is herein incorporated by reference in its entirety, can be used to implement an SVD-based filtering to extract the microbubble signals.

Optionally, the isolated microbubble signals in the microbubble signal data can be pre-processed, as indicated at step 206. As one example, this pre-processing may include denoising the microbubble signals. Removing the noise in each frame of the microbubble signal can help to more accurately localize and track the microbubbles.

In general, noise has similar features to microbubble signals, and it can be challenging to differentiate the two when the noise becomes stronger and the microbubble signal gets weaker in deeper regions of the tissue. As a result, noise signals can be falsely marked as microbubble signals, which results in inaccurate microbubble tracking and accumulation.

As one example, denoising can be implemented using an intensity-based thresholding method. Such methods are more accurate when it can be assumed that the microbubble signals are stronger than the background noise signals. For example, by suppressing pixels with intensity values less than a selected value (e.g., −30 dB to the maximum intensity value in the current field-of-view), a significant amount of background noise can be suppressed.

As another example, the microbubble signals can be denoised based at least in part on the spatiotemporal information contained in the microbubble signals. Because microbubbles move with blood flow, the microbubble movements are deterministic events that can be continuously tracked in multiple acquisition frames, while noise events are random and will not show any track-like features across multiple acquisition frames. These differences between microbubbles and noise can be exploited in the spatiotemporal domain for robust noise suppression. As an example, a non-local means ("NLM") denoising filter can be applied to the original, noisy microbubble data.

Another advantage of the spatiotemporal denoising filter described above is that because the denoising is performed in the spatiotemporal domain, there is little to no spatial blurring of the underlying microbubble signal. Other denoising methods (e.g., convolutional Gaussian smoothing, Gaussian spectral apodization, wavelet thresholding, or iterative total variation ("TV") minimization) can also be used in the spatiotemporal domain to achieve similar denoising effect. In some implementations, the axial-temporal microbubble signal data can be used for denoising, while in other implementations lateral-temporal data or full axial-lateral-temporal 3D data can also be used for denoising.

In general, noise suppression can be performed using any suitable denoising filter, including but not limited to any form of spatial-temporal low-pass filter, smooth filter, median filter, Savitzky-Golay filter, nonlocal mean filter, amplitude thresholding, and so on. An intensity equalization process can also be performed to equalize the spatial-dependent intensity of the microbubble signals due to the effect of time-gain compensation ("TGC"), tissue attenuation and beamforming process. Examples of such techniques, such as using a noise profile to equalize the microbubble signals, are described in U.S. patent application Ser. No. 16/079,289, which is herein incorporated by reference in its entirety.

The microbubble signal data are separated into subsets of microbubble signal data, as indicated at step 208. In general, the microbubble signal data are separated into subsets based on microbubble properties, characteristics, or both. In this way, each subset of microbubble signal data will have a sparser concentration than the original microbubble signal data. In some embodiments, the microbubble signal data can be separated into subsets based on the spatial-temporal hemodynamic characteristics of microbubbles in the microbubble signal data. In some other embodiments, the microbubble signal data can be separated into subsets based on acoustic characteristics of microbubbles. In still other embodiments, the microbubble signal data can be separated into subsets by inputting the microbubble signal data to a suitably trained machine learning algorithm, or other artificial intelligence-based algorithms, generating output as subsets of separated microbubble signal data. These separation techniques can also be combined. Examples of these separation techniques are described in more detail below.

After the microbubble signal data are separated into different subsets, super-resolution microvessel images are generated from each subset of microbubble signal data, as indicated generally at process block 210. This process can generally include removing tissue motion, microbubble localization, and microbubble tracking and accumulation. The super-resolution microvessel images can include microbubble density images, which can depict morphology of microvasculature; microbubble velocity images, including velocity amplitude and direction, which can depict the microbubble flowing speed distribution; and so on.

Microbubbles are localized in each subset of microbubble signal data, as indicated at step 212. In general, this process includes identifying locations in each time frame of the microbubble signal data at which microbubbles are located. For instance, the center location of each isolated microbubble signal is located, such that the movement of the microbubble can be tracked through time. The center location of the localized microbubbles can also be used to construct super-resolution microvessel images and to track the movement of the microbubbles to calculate hemodynamics measurements, such as blood flow speed.

In some implementations, the microbubbles can be localized in the denoised microbubble signal data using deblurring and deconvolution methods, such as the CLEAN algorithm, sparsity or entropy-based iterative regression methods, a blind deconvolution method, and so forth.

In some other implementations, the microbubbles can be localized based on a two-dimensional normalized cross-correlation-based method that focuses on detecting structures with good correlation to the point-spread-function ("PSF") of the ultrasound system used to acquire the microbubble signal data, as described in co-pending patent application Ser. No. 16/617,628, which is herein incorporated by reference in its entirety.

As noted above, before the accumulation of microbubble position, or before the microbubble tracking, tissue motion can optionally be removed from the microvessel images, as indicated at step 214. For instance, image registration can be performed to remove tissue motion to avoid blurring in the microvessel images. Image registration can be performed based on motion estimations from the original acquired ultrasound data, or on the microbubble signal data. Any suitable image registration algorithm can be applied, including but not limited to global or local cross-correlation methods, global or local phase-correlation based methods, global or local optical flow methods, and so on.

After the microbubbles are localized, their locations are accumulated and tracked, as indicated at step 216. In addition to being useful for producing super-resolved microvessel images and hemodynamics measurements, the microbubble tracking process can also provide a quality control step for the microbubble localization step. For instance, microbubble tracking can be used to reject false microbubble localizations from noise or unreliable microbubbles signals by removing localized microbubbles that cannot be tracked for a certain amount of time.

As one example, microbubble tracking can be implemented by locally tracking a single microbubble's movement. As another example, a global microbubble tracking method can be implemented. Examples of microbubble tracking techniques that can be implemented include local and global tracking methods, such as those described in co-pending patent application Ser. No. 16/617,628, which is herein incorporated by reference in its entirety.

After the microbubbles have been localized and tracked in the microbubble signal data and tissue motion removed, one or more microvessel images are produced for each subset of microbubble signal data based on the localization and tracking results for that subset, as indicated at step 218. Because the microvessel images are generated from subsets of data in which microbubbles signals have been separated into sparser data sets, the microvessel images will also each be representative of a sparser microbubble density. In some embodiments, the microvessel images can include accumulated microbubble location maps throughout all of the acquisition frames. As another example, the microvessel images can include blood flow speed maps with blood speed values assigned to all the locations at which microbubbles were detected.

An accumulated microbubble location map depicts the number of times that a microbubble appeared at a certain location. Typically, larger vessels have more microbubbles flow through them during a given time interval, and thus will appear brighter than smaller vessels, which have fewer microbubbles flowing through them within the same time interval.

The microvessel images generated for each subset are then combined to generate a microvessel image representative of a higher microbubble density, as indicated at step 220. With bubble separation methods, many overlapping microbubble signals, which otherwise may be discarded, can be separated and localized separately. The number of detected microbubbles in the combined microvessel image can therefore be significantly increased for better microvasculature reconstruction. The microvessel images from each subset can be combined using any suitable method, such as averaging or weighted averaging. For instance, the combination of microvessel velocity images from different subsets of data can be in any appropriate form, such as taking the mean, density-weighted average (average weighted by the density image), median of the subset velocity images, and so on, to generate the final microvessel velocity image.

After processing, the microvessel images (e.g., the combined microvessel image(s), the subset microvessel images, or both) can be displayed to a user or stored for later use, such as for later analysis, as indicated at step 222. In some implementations, microvascular morphology measurements (e.g., vessel density and vessel tortuosity) can be estimated from the combined microvessel image or images. As another example, microvessel hemodynamics measurements (e.g., blood flow speed and blood flow volume) can be estimated from the combined microvessel image or images. For instance, the microvessel images can be superimposed, or presented side-by-side, with B-mode images of the targeted tissue. Alternatively, microvessel blood flow speed images with color-encoded flow direction can also be superimposed, or presented side-by-side, with B-mode images of the targeted tissue. In such implementations, a multi-flow-direction color hue can be used to indicate more than two directions of flow. Additionally or alternatively, other derived measurements, such as other morphological measurements or hemodynamic measurements, can be estimated from the microvessel images and displayed to a user or stored for later use. For instance, other morphological measurements, hemodynamic measurements, or both, can be estimated based on microbubble density and/or microbubble velocity images. Maps of these estimated measurements can be generated, or individual measurements can be estimated and stored.

Vessel density can be calculated by selecting a region-of-interest on the combined microvessel image or images, from which the vessel density can be calculated by the total area (or total volume as in 3D imaging) of the vessel signal divided by the total area (or volume) of the region-of-interest. Vessel tortuosity can be measured by methods such as the distance metric, which provides a ratio of the actual path length of vessels normalized by linear distance between the vessel curve endpoints. The microvessel blood flow speed from the entire region-of-interest can be averaged to represent the perfusion index, or the blood flow speed can be integrated by the total cross-sectional area of the microvessel within the region-of-interest to derive a cross-sectional blood flow volume rate that can represent the perfusion index, or the blood flow speed from all microvessels can be used to generate a histogram (e.g., with x-axis representing blood flow speed and y-axis representing the total number of pixels with a certain blood flow speed in each x-axis bin) to represent the perfusion index.

The combined super-resolution microvessel image or images can also be displayed as dynamic video clips that show the dynamic microbubble movement to present the process of perfusion of a certain microvasculature. The movement of the microbubbles, which provides information of perfusion, can be monitored over time using such an approach. Another aspect of displaying a dynamic video clip is to use a different number of microbubble image frames to accumulate for different levels of microvessel details that can be dynamically displayed. For example, the more frames that are accumulated, the more microbubble movement tracks that can be visualized at a certain time instant. A high frame accumulation can be used to visualize slower flow vessels, and a low frame accumulation can be used to visualize faster flow vessels. Thus, by selectively choosing the number of frames to accumulate for a display, different blood flow speeds can be depicted and displayed to the user.

The flowchart illustrated in FIG. 2 provides the general steps of performing super-resolution microvessel imaging based on microbubble separation. Some of the steps can be optional, additional steps may be inserted, and the order of the steps can be appropriately adjusted. For instance, microbubble signal extraction may be omitted for specific imaging sequences, such as nonlinear contrast imaging, where the tissue clutter has already been suppressed from the acquired ultrasound data. In another example, the pre-processing may be omitted or partially omitted for those microbubble data with high signal-to-noise ratio ("SNR"). In yet another example, tissue motion removal may be omitted for those data with little or without tissue motion. Likewise, the tissue motion removal can be performed on the ultrasound data or the microbubble signal data.

As noted above, microbubble signal data can be separated into different subsets of data based on properties or characteristics of the microbubbles. As one example, microbubble signals can be separated based on the differences of spatiotemporal hemodynamics among microbubbles. For instance, different microbubbles in an image may have different movement speeds and directions, or their signals may de-correlate differently. By taking advantage of these microbubble hemodynamic differences, microbubble signals that may otherwise spatially or temporally overlap can be reliably separated from each other. In general, any processing algorithm that can distinguish microbubble signals with different moving speeds/directions and separate them into different subsets can be applied here.

In one example, microbubbles with different moving velocities can be separated using eigen-based filtering, including but not limited to singular value decomposition ("SVD") filtering, principal component analysis ("PCA"), or other eigenvalue-based decompositions. In SVD filtering, the hypothesis is that different singular values are associated with microbubbles with different spatiotemporal coherence, which can be caused by different movement speeds, different movement directions, or both. A similar hypothesis applies to PCA other eigenvalue-based decompositions, where microbubbles with different spatiotemporal coherence can be associated with different components, eigenvalues, or so on.

Figure 3:
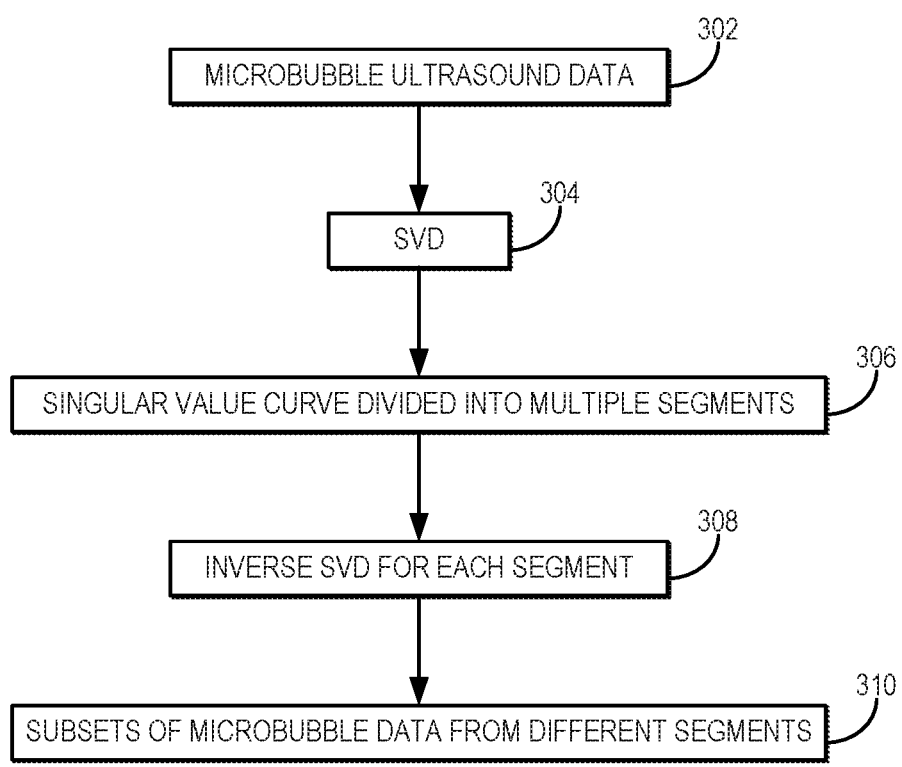
FIG. 3 is a flowchart setting forth the steps of an example method for separating microbubble signal data into subsets of data based on SVD filtering.

Referring now to FIG. 3, a flowchart is illustrated as setting forth the steps of an example method for separating microbubble signal data into subsets of data based on SVD filtering. In general, fast-moving microbubble signals de-correlate faster than slow-moving microbubble signals, and thus tend to be less coherent in the spatial-temporal domain.

The method includes accessing microbubble signal data with a computer system, as indicated at step 302. The microbubble signal data can be accessed by retrieving such data from a memory or other data storage device or medium. As one example, the microbubble signal data can be accessed after they are generated by the computer system as described above. A singular value decomposition is then performed on the microbubble signal data, as indicated at step 304. As one example, the microbubble signal data are input to an SVD filter, generating output as singular value data, which may include singular values, a singular value curve, or combinations thereof.

In SVD filtering, tissue signals are typically represented by the low-order singular values, slow-moving microbubble signals are typically represented by low-to-medium-order singular values, and fast-moving microbubble signals are typically represented by medium-to-high-order singular values. The singular value data are therefore divided or otherwise separated into segments, as indicated at step 306. For instance, the singular value data can be separated into segments by selecting a range of singular values for each segment, or by equally or non-equally dividing the singular value data into the segments. An inverse SVD is then applied to the segments of singular value data in order to reconstruct subsets of microbubble data, as indicated at step 308. By dividing the singular value curve into several segments and performing inverse SVD separately to reconstruct the microbubble signal data, the original data are divided into several subsets.

The number of segments (i.e., the number of data subsets) can be arbitrary. Overlaps between segments of the singular value curve, and a smooth transition between adjacent segments, can be used in some implementations to improve the reconstruction of the subsets of microbubble signal data. Each subset of data corresponds to a specific segment of singular value curve, which contains microbubble signals with certain coherence/velocity ranges associated with the singular value segment. This SVD filtering can be performed on the extracted microbubble signal data, or on the original acquired ultrasound data.

In another example, the microbubble signal data can be separated using temporal filtering, based on the hypothesis that microbubbles with different velocities correspond to different Doppler frequency components (i.e., frequency components in temporal direction). The Doppler frequency is typically estimated as the frequency of blood flow or microbubble signals along the temporal dimension (which may also be referred to as the slow-time dimension). The amount of Doppler frequency shift is proportional to microbubble moving velocity along the axial direction (i.e. along the ultrasound beam direction).

Figure 4:
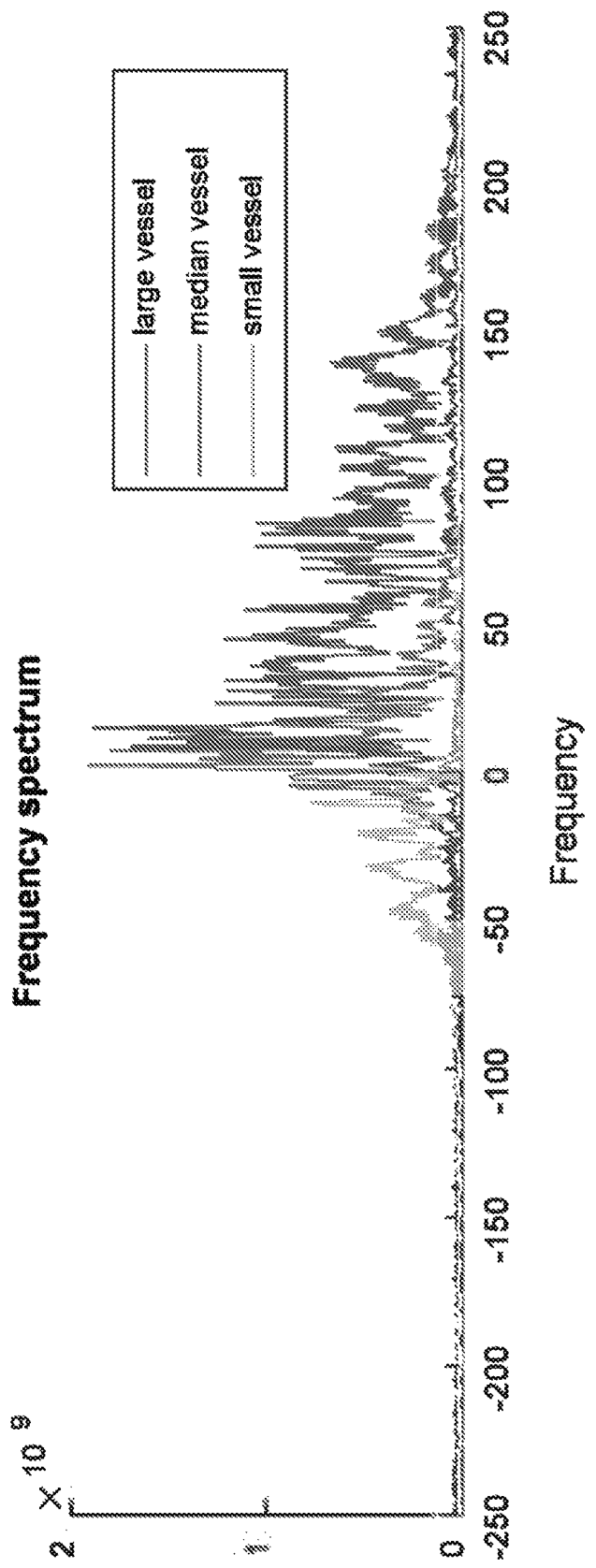
FIG. 4 is an example of a frequency spectrum, which can be used to separate microbubble signal data into subsets of data.

As an illustration, frequency spectrums of microbubble ultrasound signals from three different size vessels with different flow speeds are plotted in FIG. 4, which roughly reveals the association between Doppler frequency shift and flow velocity: the higher the flowing speed, the larger the Doppler frequency shift is. Using appropriate temporal filters (e.g., low-pass filters, band-pass filters, high-pass filters), different Doppler frequency components can be separated. In this way, the original microbubble signal data can be separated into multiple subsets of data each corresponding to a different Doppler frequency band. The number of subsets of data (i.e., the number of frequency bands) can be arbitrary.

Different Doppler frequency bands can have overlaps, and smooth transitions between stopbands and passbands for each filter can be beneficial for signal reconstruction. Any suitable type of filter can be applied, including but not limited to infinite impulse response ("IIR") and finite impulse response ("FIR") filters.

In yet another example, the microbubble signal data can be separated using temporal-based directional filtering, based on the hypothesis that positive and negative Doppler frequency components correspond to microbubbles moving toward and away from the transducer, respectively. Therefore, this method is also based on the difference of Doppler frequency shift to separate microbubbles moving with different directions.

Figure 5:
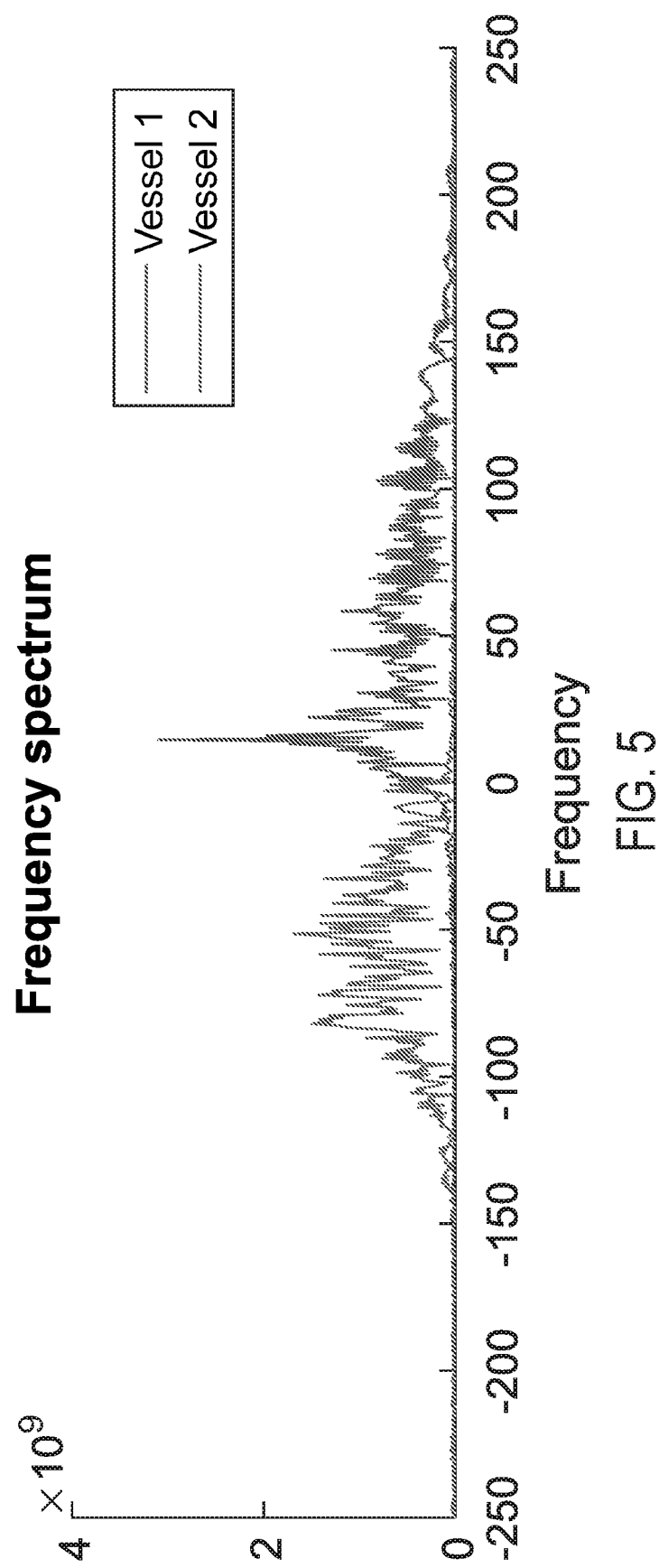
FIG. 5 is an example of Doppler frequency spectrum, which can be used to separate microbubble signal data into subsets of data based on positive frequency components and negative frequency components.

Generally, the positive Doppler frequency components of the blood flow or microbubble signals (signals along the temporal dimension) correspond to the flow moving towards the transducer (upwards), and the negative Doppler frequency components represent the flows moving away from the probe (downwards). FIG. 5 shows example Doppler frequency spectra of microbubble signals moving in opposite directions, where the positive or negative components are dominant for the two Doppler signals, respectively. By separating the positive and negative Doppler frequency components, the microbubbles data can be separated into two subsets with opposite moving directions.

For separation of positive and negative Doppler frequency components, a Fourier transform can be used to calculate the frequency spectrum along the temporal direction of the microbubble signal, and then positive and negative halves of the spectrum can be split. After the spectra are split, inverse Fourier transforms can be performed to retrieve the two subsets of data. Smooth transitions between frequency bands in the frequency domain can be applied to avoid signal blurring in the time domain. This separation operation is a process of temporal filtering, and thus any type of filters that can separate the data into positive and/or negative components can be applied to perform the microbubble separation. Again, the filter can be in any suitable form, including but not limited to IIR and FIR filters.

In yet another example, microbubble signals can be separated using spatial-temporal based filtering, based on the hypothesis that microbubbles with different velocity and moving directions may occupy different quadrants (subspaces) of the Fourier spectrum of spatial-temporal microbubble data. A spatial-temporal filter is applied to isolate the microbubbles moving in different directions and velocity. To perform multi-directional and multi-velocity filtering, the spatial-temporal (x,y,t) microbubble signal data can be converted to the spatial frequency-temporal frequency domain ($k_x, k_y, f_t$) or the wavenumber-frequency domain (k-f) by using a 3D Fourier transform. The components in the wavenumber domain represent the direction and velocity information of the flows, and thus filters can be designed on the wavenumber-frequency domain to preserve certain angular and velocity components and suppress the rest.

Figure 6:
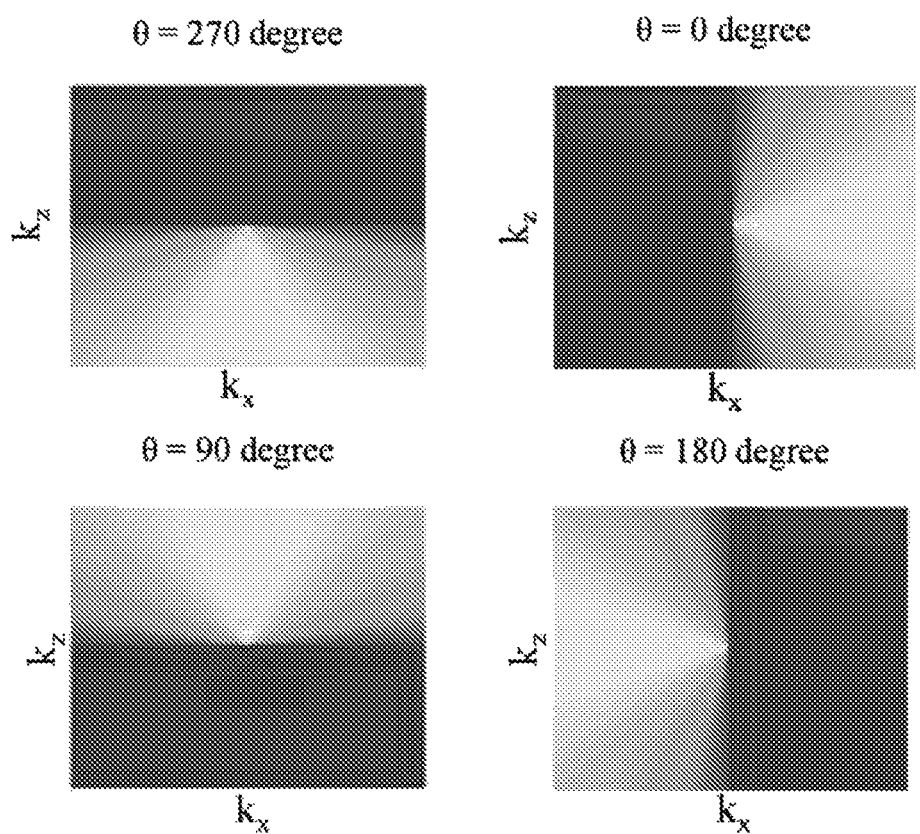
FIG. 6 is an example of microbubble signal data transformed into the k-f domain in order to separate the microbubble signal data into subsets of data based on different microbubble velocities and directions.

As an example, FIG. 6 shows the filter response for separating bubbles in four different directions. The edge (transition) of the directional filter can be smoothed to minimize the blurring effect of the filtered microbubble signals using any kind of window functions or filters. Further, a band-pass filter can still be imposed on the directional filter response in the radial direction to suppress the high or low spatial frequency components in the k-f domain in order to suppress unwanted motion components. Microbubbles moving within the angular range near the primary direction can be preserved for each directional filter, and microbubbles moving in other directions will be suppressed.

The velocity range can also be combined into the directional filter design by considering the $f_t$ domain, to separate bubbles with different motion directions and velocity ranges. Any suitable filter operating on the 3D k-f domain can be applied. As one example, a set of 3D cone-shaped filters in the k-f domain can be used to separate microbubble signals with different directions and speeds into subsets of data. Again, a relatively large passband for each 3-D filter with smooth transitions and large overlaps between adjacent filters may be applied to minimize MB signal distortion. Therefore, by applying these multi-directional and multi-velocity filters, the original microbubble populations can be separated into multiple subsets with sparser populations. Again, the number of directions and velocity ranges for bubble separation can be arbitrary.

Figure 7:
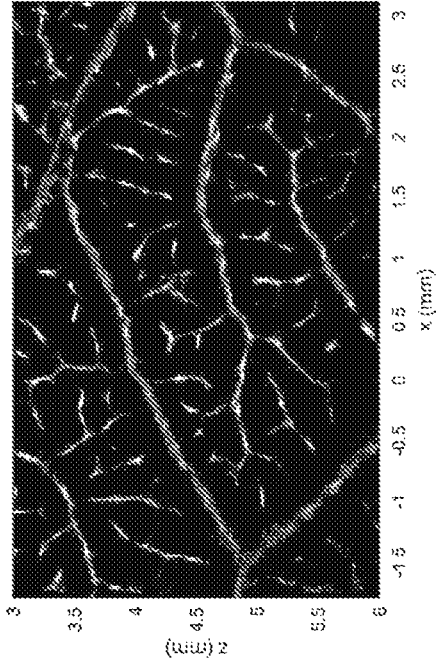
FIG. 7 shows examples of microvessel density images generated using methods described in the present disclosure compared to a microvessel density image generated without microbubble signal data separation.
Figure 7:
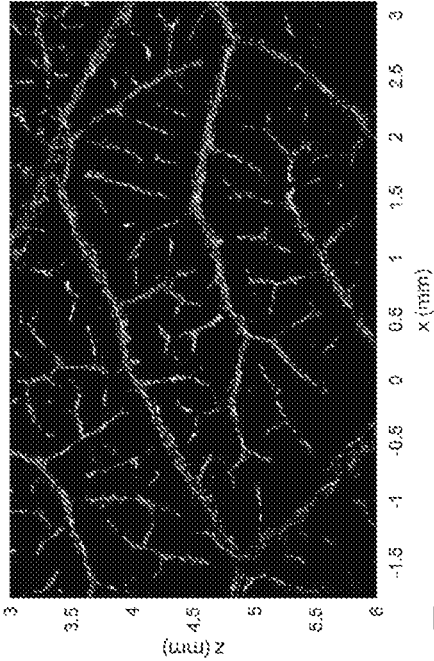
Figure 7:
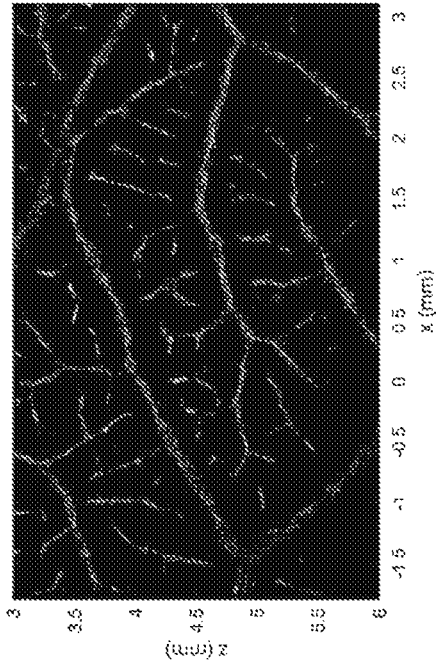
Figure 7:
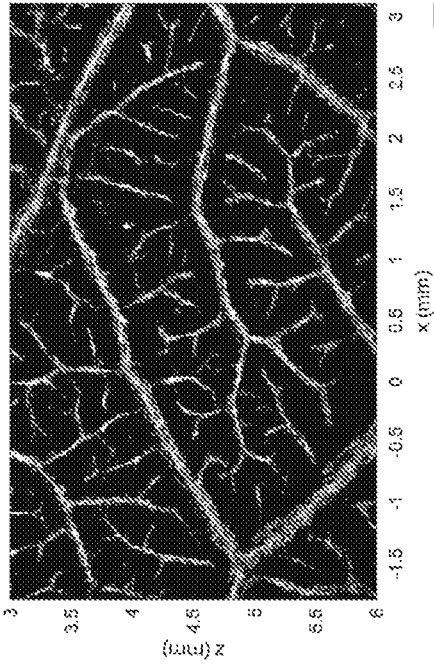
Figure 8:
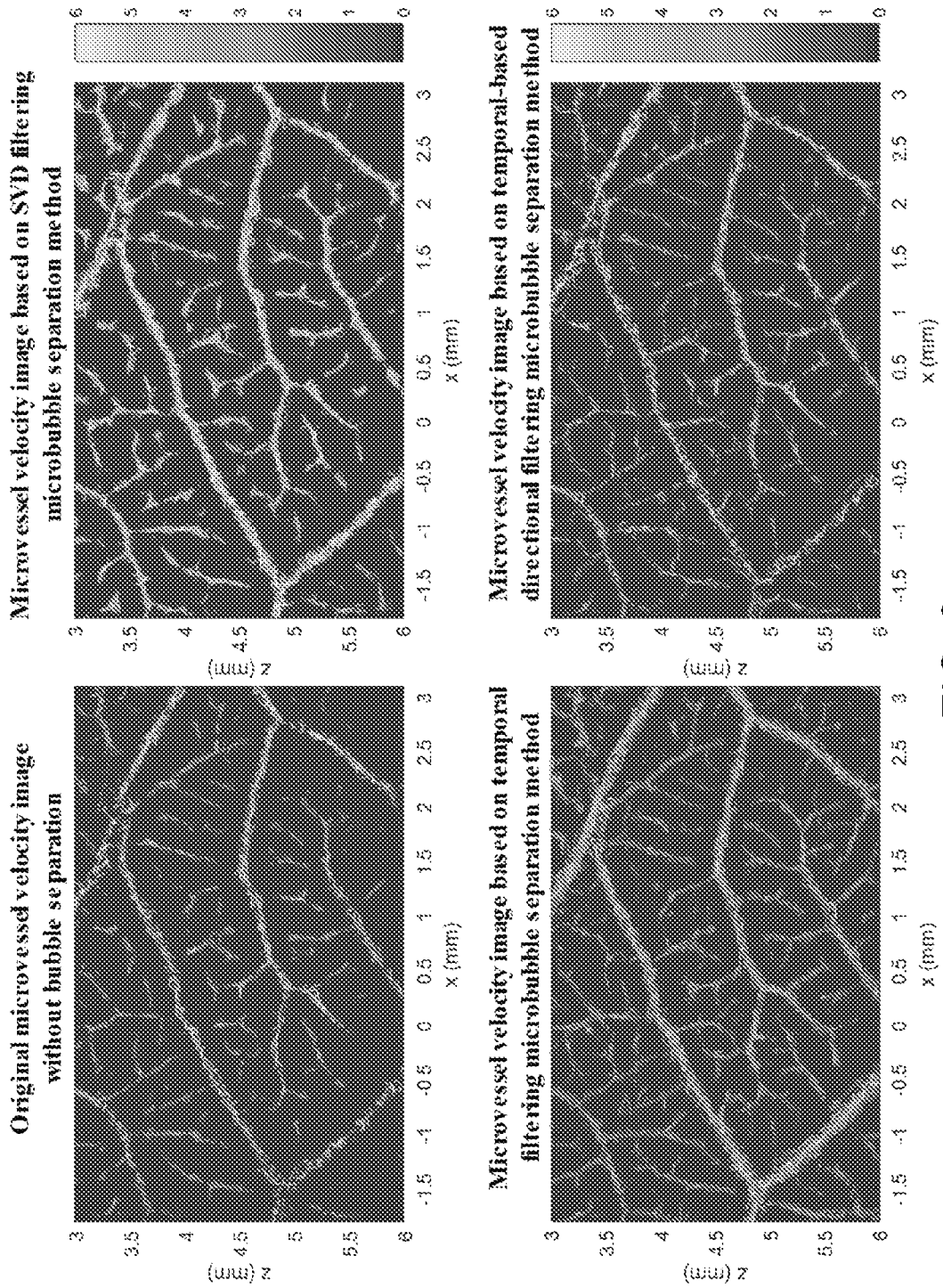
FIG. 8 shows examples of microvessel velocity images generated using methods described in the present disclosure compared to a microvessel velocity image generated without microbubble signal data separation.

FIGS. 7 and 8 show examples of super-resolution microvessel density images and microvessel velocity images, respectively, based on ultrasound data acquired from a chick embryo chorioallantoic membrane (CAM). The images shown in FIGS. 7 and 8 were generated from the original data without bubble separation; using SVD filtering to generate nine subsets of microbubble signals data, from which images were generated and combined; using the temporal filter based microbubble separation method, which shows much more subtle microvasculature that cannot be resolved by original microvessel images without bubble separation; and using the temporal-based directional microbubble separation method. In each instance, it can be seen that the microvasculature can be better resolved using the microbubble separation methods because in these instances a larger number of microbubbles are detected that otherwise would not have been detected without the microbubble separation techniques.

As stated above, the microbubble separation techniques described above can be used separately or in combination with each other to separate microbubble signal data into subsets. Any combination between methods can be applied. In one example, SVD-based filtering can be combined with temporal filtering to further separate microbubble signal data from each singular value segments into multiple frequency bands. In another example, temporal filtering can be combined with the temporal-based directional method to further separate each frequency band into positive and negative halves. In yet another example, SVD-based filtering can be combined with the temporal-based directional method to further separate microbubble data from each singular value segment into positive and negative Doppler frequency components. In yet another example, all the above methods can be combined together to perform microbubble separation.

Figure 9:
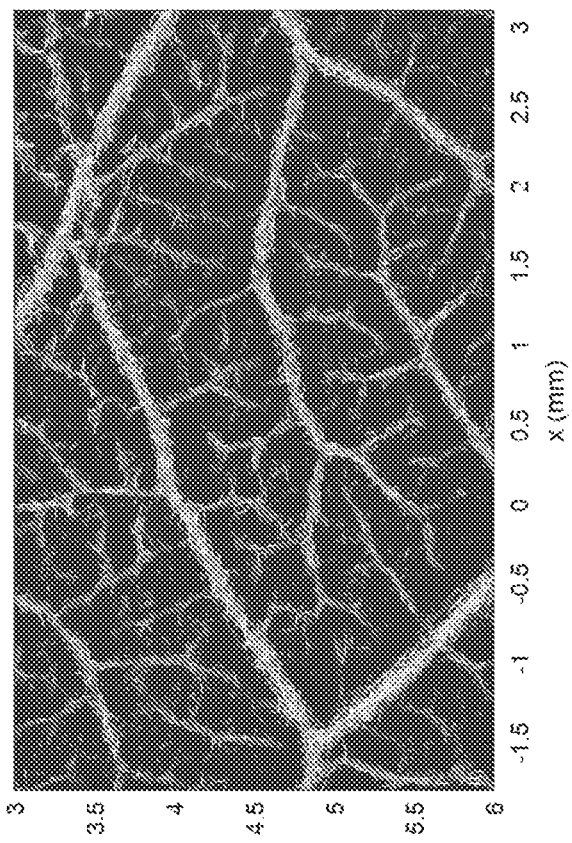
FIG. 9 shows examples of microvessel density and velocity images generated using combinations of methods described in the present disclosure.
Figure 9:
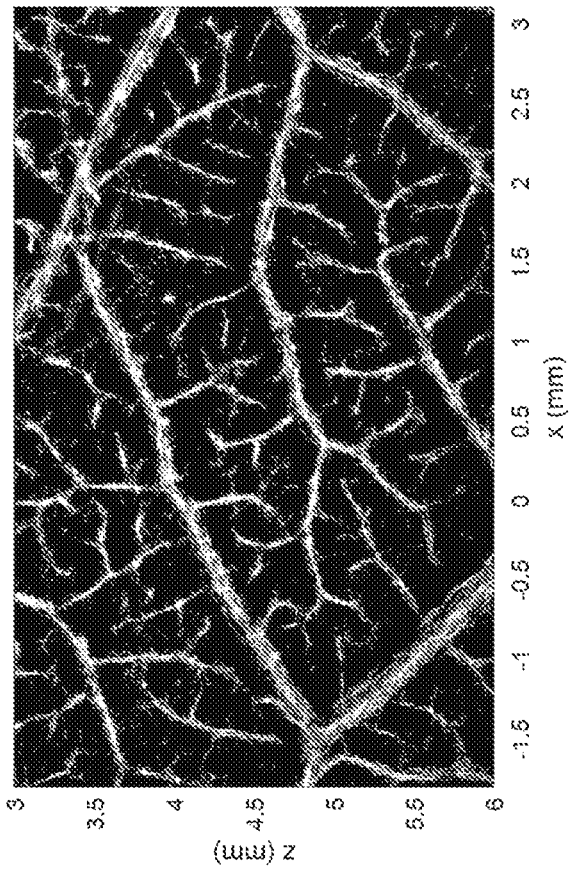
Figure 10:
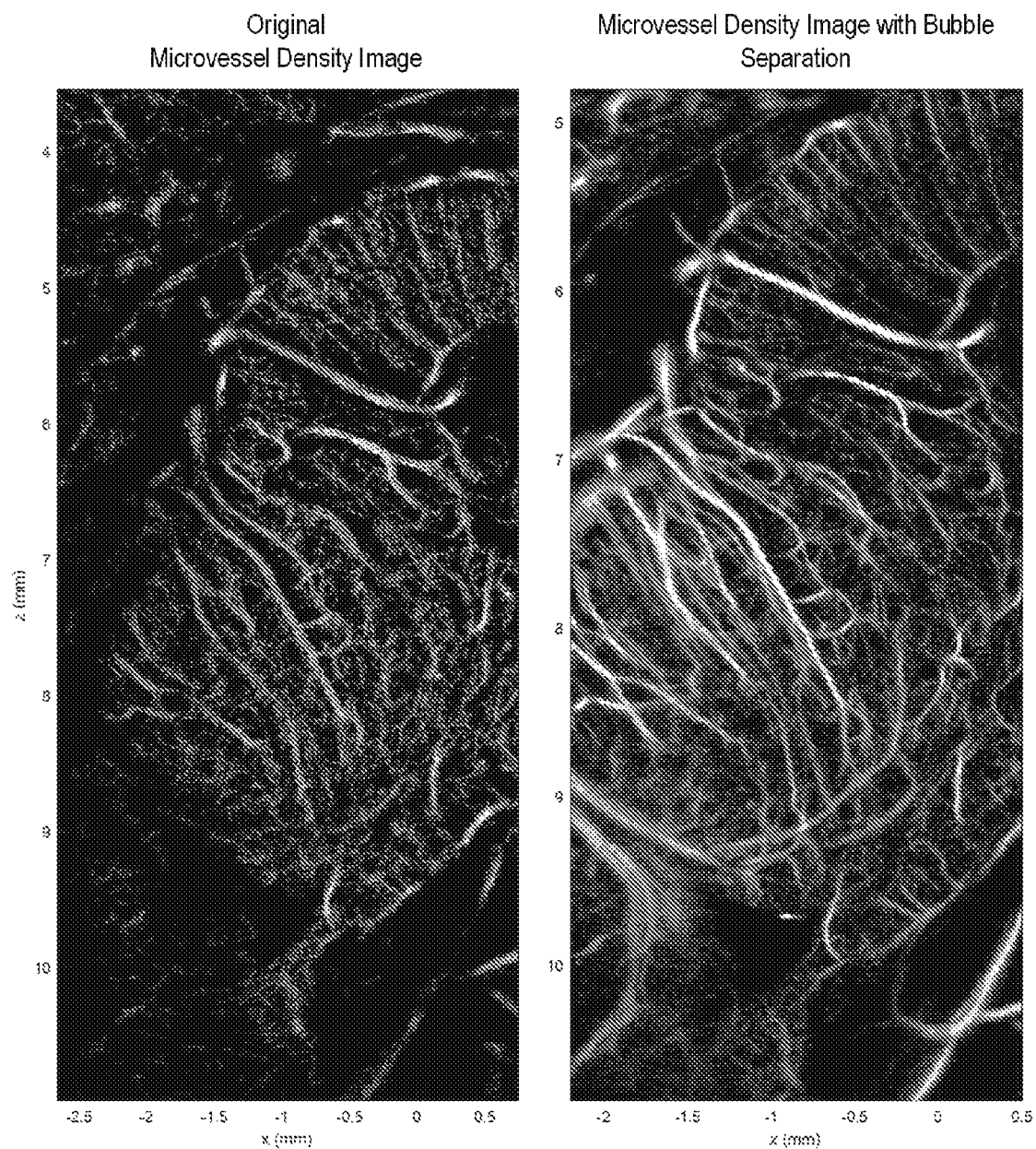
FIG. 10 shows another example of a microvessel density image generated using methods described in the present disclosure compared to a microvessel density image generated without microbubble signal data separation.

As an illustration, FIG. 9 shows a super-resolution microvessel density image and a microvessel velocity image obtained with the combination of temporal filtering and temporal-based directional microbubble separation methods. Further improvement in microvasculature reconstruction and blood flow speed estimation can be observed as compared with the microvessel images derived with either one of the two methods individually. FIG. 10 shows another super-resolution microvessel image from a chick embryo brain, showing the significant improvement that can be achieved with the combination of temporal filtering and temporal-based directional microbubble separation methods.

As noted above, microbubble signal data can in some instances be separated into different subsets of data based on properties or characteristics of the microbubbles using artificial intelligence ("AI") based techniques. As one non-limiting example, the microbubble signal data can be input into an appropriately trained machine learning algorithm, generating output as subsets of separated microbubble signal data. Microbubble signal data can be separated based on properties or characteristics, such as any hemodynamic (e.g., moving velocity, direction, and so on) or acoustical property (e.g., intensities, blinking behaviors, frequency response to the sonifying ultrasound waves, and so on) that can distinguish microbubble signal from each other.

AI-based methods that can exploit the characteristics of microbubble signals can be used to perform the classification, isolation, and/or separation of the microbubble signal data into subsets of data. In machine learning, any suitable algorithm can be applied, including but not limited to feature learning, deep learning, sparse dictionary learning, and so on. The machine learning algorithms can be supervised, semi-supervised, or unsupervised. For deep learning, any suitable algorithm can be beneficially applied for the purpose of microbubble separation, such as convolution neural network ("CNN"), deep neural network ("DNN"), feedforward neural network ("FNN"), deep Boltzmann network ("DBN"), and so on.

AI-based methods, such as machine learning, typically involve a large amount of representative data, with or without specific labels, to serve as a training set to train the algorithm. In some instances, the more data being used to train the machine learning algorithm, the more accurate the algorithm can be. Therefore, the generation of training data is an important consideration when constructing a machine learning algorithm for a specific task. As one example, computational simulations, phantom experiments, or both, can be used to generate microbubble data as a training set, which can then be used to train a suitable AI algorithm, such as a machine learning algorithm.

When the training data include computational simulations, the ultrasound signals of microbubbles with different characteristics such as concentrations, hemodynamics (e.g., moving velocity, direction) and acoustical properties (e.g., intensities, blinking behaviors, and frequency response to the sonifying ultrasound waves) can be simulated. The point spread function ("PSF") of the ultrasound image in the computational simulation can be varied according to practical imaging situations. The PSF can be experimentally measured or can be approximated using a Gaussian model or other suitable models. The initial spatial locations and the backscattering intensity of the microbubbles can be randomized, and background noise can be added to mimic the true microbubble imaging scenarios. These simulated microbubble data can be labeled with different properties or characteristics and allocated into different subsets, and serve as the training data for machine learning algorithms.

In another example, the training microbubble data can be obtained from any type of flow phantom, flow channel, water tank, or in vivo vessel using certain ultrasound systems with injections of microbubbles. Ultrasound data acquisition can be performed under various imaging and experimental settings, such as different microbubble concentrations, flowing velocities and directions, different acoustic transmission and SNR situations, and so on. Again, the training data can be labeled as different microbubble characteristics or different subsets, and can be used to train a suitable AI algorithm. Then, the trained algorithms can be applied to perform microbubble separation on the target microbubble data to separate them into subsets with sparser microbubble concentrations.

One or more neural networks (or other suitable machine learning algorithms) are trained on the training data. In general, the neural network can be trained by optimizing network parameters (e.g., weights, biases, or both) based on minimizing a loss function. As one non-limiting example, the loss function may be a mean squared error loss function.

Training a neural network may include initializing the neural network, such as by computing, estimating, or otherwise selecting initial network parameters (e.g., weights, biases, or both). Training data can then be input to the initialized neural network, generating output as separated subsets of microbubble signal data. The quality of the output data can then be evaluated, such as by passing the output data to the loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. When the error has been minimized (e.g., by determining whether an error threshold or other stopping criterion has been satisfied), the current neural network and its associated network parameters represent the trained neural network.

Figure 11:
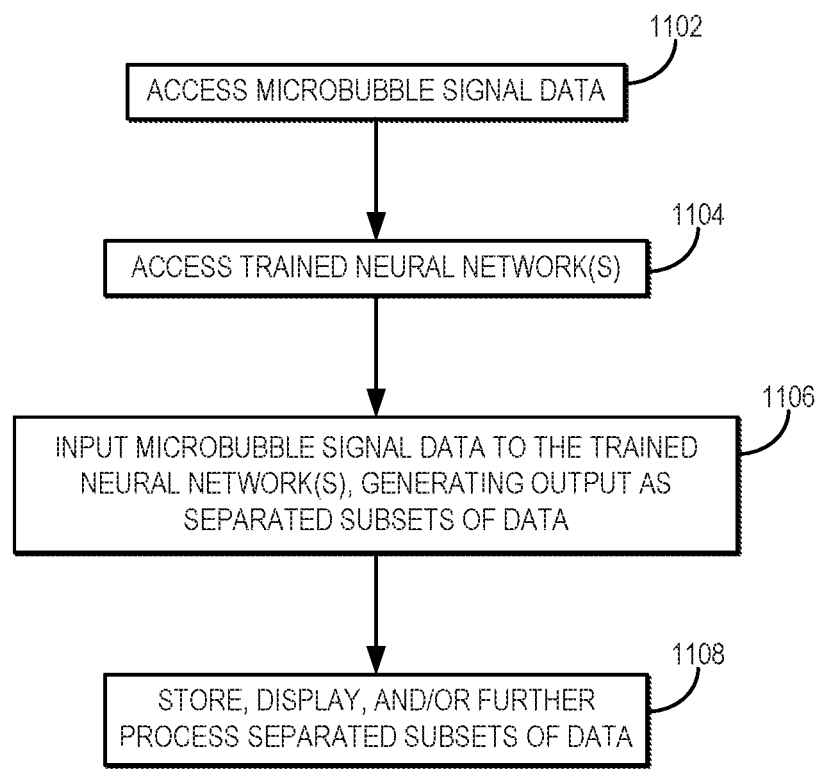
FIG. 11 is a flowchart setting forth the steps of an example method for separating microbubble signals based on different microbubble properties using a trained neural network or other machine learning algorithm.

Referring now to FIG. 11, a flowchart is illustrated as setting forth the steps of an example method for separating microbubble signal data into different subsets of data based on properties or characteristics of the microbubbles using a suitably trained neural network or other machine learning algorithm.

The method includes accessing microbubble signal data with a computer system, as indicated at step 1102. Accessing the microbubble signal data may include retrieving such data from a memory or other suitable data storage device or medium. Alternatively, accessing the microbubble signal data may include acquiring or otherwise generating such data with an ultrasound system, as described above, and transferring or otherwise communicating the data to the computer system, which may be a part of the ultrasound system.

A trained neural network (or other suitable machine learning algorithm) is then accessed with the computer system, as indicated at step 1104. Accessing the trained neural network may include accessing network parameters (e.g., weights, biases, or both) that have been optimized or otherwise estimated by training the neural network on training data. In some instances, retrieving the neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the neural network is trained, or has been trained, on training data in order to separate microbubble signal data into subsets of data based on properties or characteristics of the microbubbles.

The properties or characteristics of the microbubbles are then input to the one or more trained neural networks, generating output as separated subsets of data, as indicated at step 1106. The output data generated by inputting the microbubble signal data to the trained neural network(s) can then be displayed to a user, stored for later use or further processing, or both, as indicated at step 1108, and described above in more detail. For example, the separated subsets of data can be further processed to generate super-resolution images, as described above.

Although the systems and methods described in the present disclosure have been described with respect to signal separation for super-resolution microvessel imaging under the context of microbubble imaging, they can also be applied to ultrasound imaging with any other type of contrast agent, or even can be applied to non-contrast ultrasound imaging. Similarly, although the systems and methods have been described in the context of two-dimensional super-resolution imaging, they can also be readily extended to three-dimensional or even higher dimensional imaging.

Figure 12:
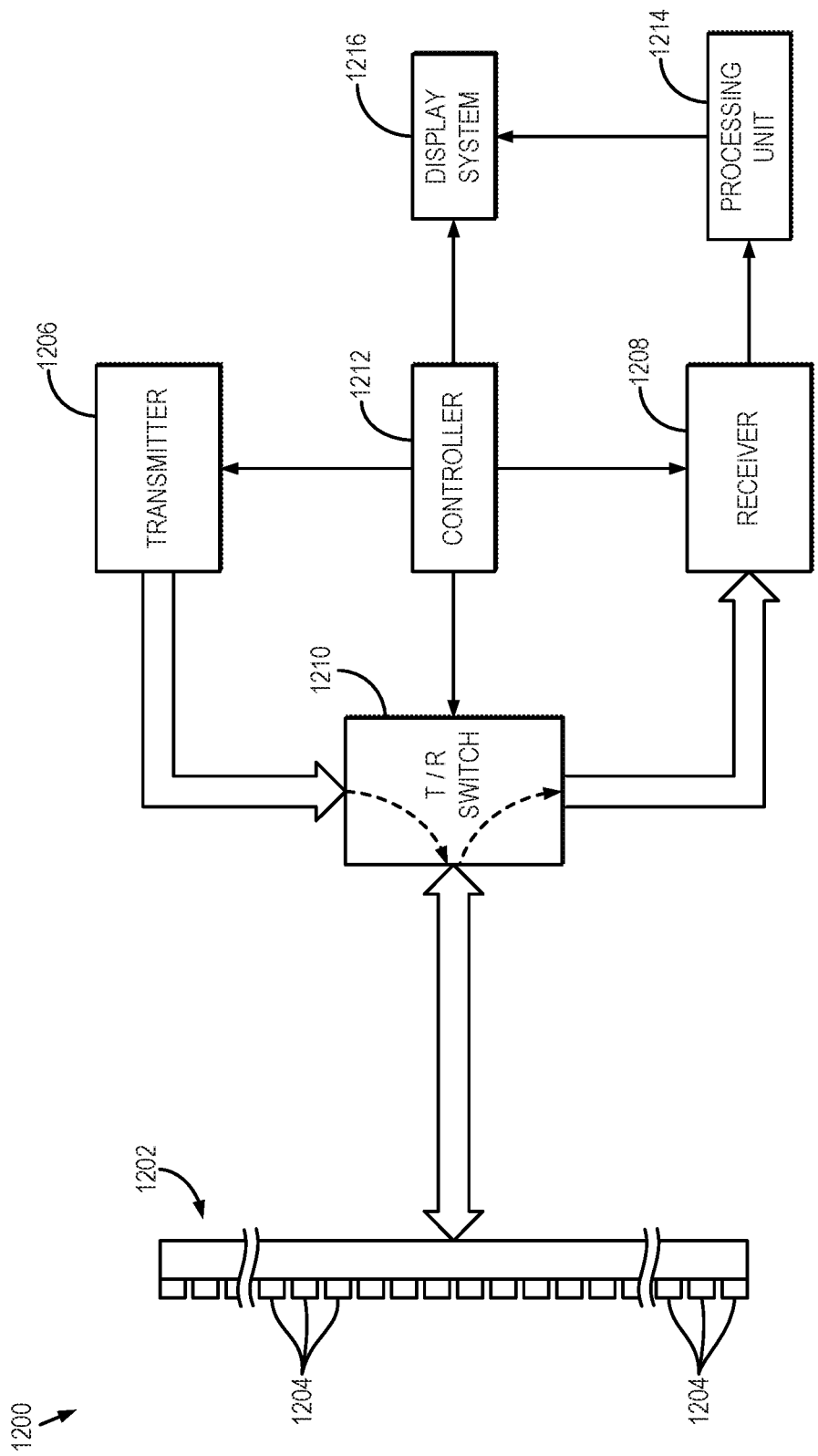
FIG. 12 is a block diagram of an example ultrasound system.

FIG. 12 illustrates an example of an ultrasound system 1200 that can implement the methods described in the present disclosure. The ultrasound system 1200 includes a transducer array 1202 that includes a plurality of separately driven transducer elements 1204. The transducer array 1202 can include any suitable ultrasound transducer array, including linear arrays, curved arrays, phased arrays, and so on.

When energized by a transmitter 1206, each transducer element 1202 produces a burst of ultrasonic energy. The ultrasonic energy reflected back to the transducer array 1202 from the object or subject under study (e.g., an echo) is converted to an electrical signal (e.g., an echo signal) by each transducer element 1204 and can be applied separately to a receiver 1208 through a set of switches 1210. The transmitter 1206, receiver 1208, and switches 1210 are operated under the control of a controller 1212, which may include one or more processors. As one example, the controller 1212 can include a computer system.

The transmitter 1206 can transmit unfocused or focused ultrasound waves. In some configurations, the transmitter 1206 can also be programmed to transmit diverged waves, spherical waves, cylindrical waves, plane waves, or combinations thereof. Furthermore, the transmitter 1206 can be programmed to transmit spatially or temporally encoded pulses.

The receiver 1208 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

Thus, in some configurations, the transmitter 1206 and the receiver 1208 can be programmed to implement a high frame rate. For instance, a frame rate associated with an acquisition pulse repetition frequency ("PRF") of at least 100 Hz can be implemented. In some configurations, the ultrasound system 1200 can sample and store at least one hundred ensembles of echo signals in the temporal direction.

The controller 1212 can be programmed to design an imaging sequence using the techniques described in the present disclosure, or as otherwise known in the art. In some embodiments, the controller 1212 receives user inputs defining various factors used in the design of the imaging sequence.

A scan can be performed by setting the switches 1210 to their transmit position, thereby directing the transmitter 1206 to be turned on momentarily to energize each transducer element 1204 during a single transmission event according to the designed imaging sequence. The switches 1210 can then be set to their receive position and the subsequent echo signals produced by each transducer element 1204 in response to one or more detected echoes are measured and applied to the receiver 1208. The separate echo signals from each transducer element 1204 can be combined in the receiver 1208 to produce a single echo signal. Images produced from the echo signals can be displayed on a display system 1214.

In some embodiments, the receiver 1208 may include a processing unit, which may be implemented by a hardware processor and memory, to process echo signals or images generated from echo signals. As an example, such a processing unit can isolate microbubble signals to produce microbubble signal data, localize microbubbles in microbubble signal data, track microbubble locations through time frames, accumulate microbubble locations, and produce microvessel images using the methods described in the present disclosure.

Figure 13:
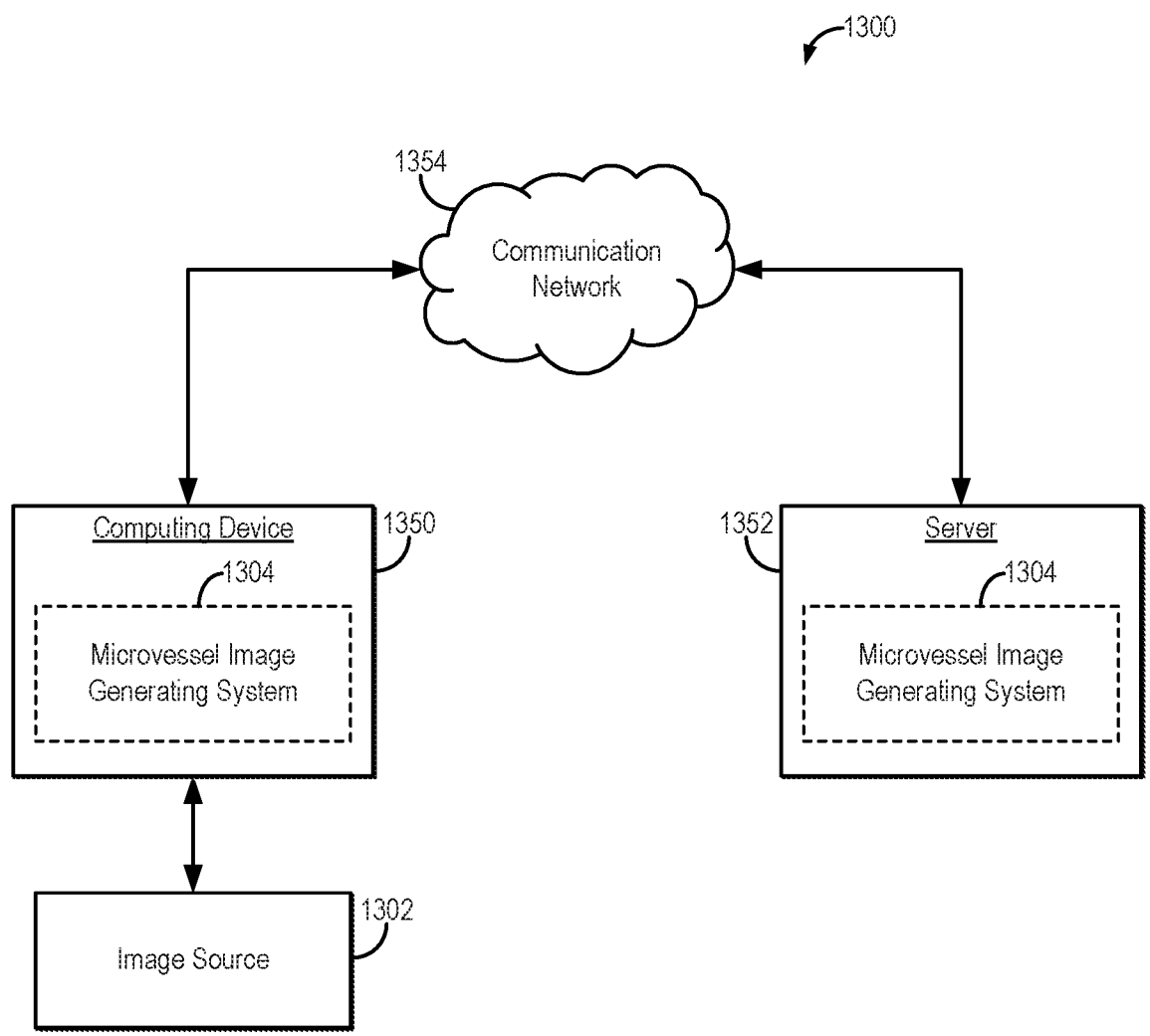
FIG. 13 is a block diagram of an example system for generating microvessel images from ultrasound data.

Referring now to FIG. 13, an example of a system 1300 for generating super-resolution microvessel images in accordance with some embodiments of the systems and methods described in the present disclosure is shown. As shown in FIG. 13, a computing device 1350 can receive one or more types of data (e.g., ultrasound data, microbubble signal data) from image source 1302, which may be an ultrasound image source. In some embodiments, computing device 1350 can execute at least a portion of a microvessel image generating system 1304 to separate microbubble signal data into subsets of data, generate microvessel images from those subsets of data, and generate a combined microvessel image by combining the microvessel images generated from the subsets of data.

Additionally or alternatively, in some embodiments, the computing device 1350 can communicate information about data received from the image source 1302 to a server 1352 over a communication network 1354, which can execute at least a portion of the microvessel image generating system 1304. In such embodiments, the server 1352 can return information to the computing device 1350 (and/or any other suitable computing device) indicative of an output of the microvessel image generating system 1304.

In some embodiments, computing device 1350 and/or server 1352 can be any suitable computing device or combination of devices, such as a desktop computer, a laptop computer, a smartphone, a tablet computer, a wearable computer, a server computer, a virtual machine being executed by a physical computing device, and so on. The computing device 1350 and/or server 1352 can also reconstruct images from the data.

In some embodiments, image source 1302 can be any suitable source of image data (e.g., measurement data, images reconstructed from measurement data), such as an ultrasound system, another computing device (e.g., a server storing image data), and so on. In some embodiments, image source 1302 can be local to computing device 1350. For example, image source 1302 can be incorporated with computing device 1350 (e.g., computing device 1350 can be configured as part of a device for capturing, scanning, and/or storing images). As another example, image source 1302 can be connected to computing device 1350 by a cable, a direct wireless link, and so on. Additionally or alternatively, in some embodiments, image source 1302 can be located locally and/or remotely from computing device 1350, and can communicate data to computing device 1350 (and/or server 1352) via a communication network (e.g., communication network 1354).

In some embodiments, communication network 1354 can be any suitable communication network or combination of communication networks. For example, communication network 1354 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 1354 can be a local area network, a wide area network, a public network (e.g., the Internet), a private or semi-private network (e.g., a corporate or university intranet), any other suitable type of network, or any suitable combination of networks. Communications links shown in FIG. 13 can each be any suitable communications link or combination of communications links, such as wired links, fiber optic links, Wi-Fi links, Bluetooth links, cellular links, and so on.

Figure 14:
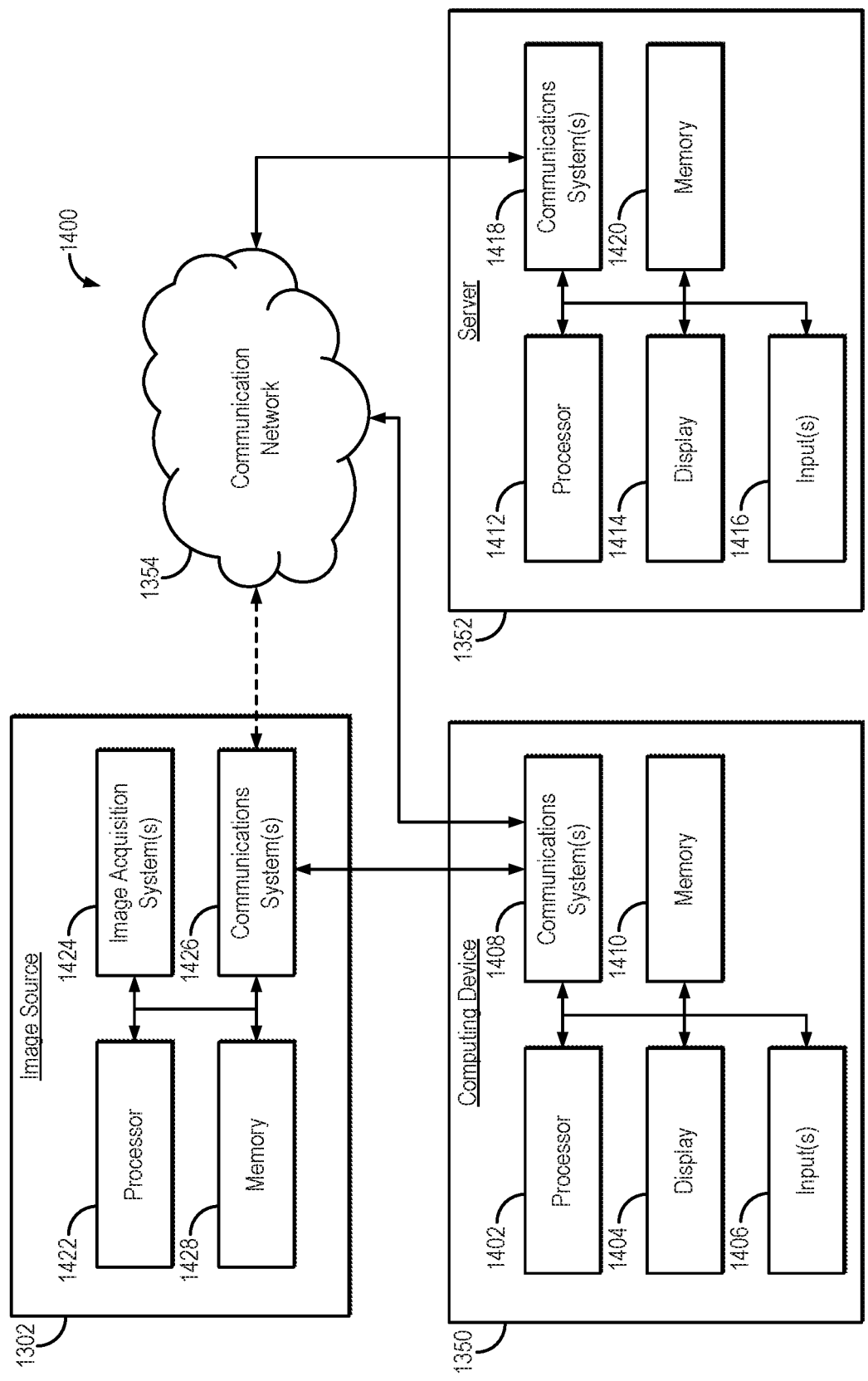
FIG. 14 is a block diagram of example components that can implement the system of FIG. 13.

Referring now to FIG. 14, an example of hardware 1400 that can be used to implement image source 1302, computing device 1350, and server 1352 in accordance with some embodiments of the systems and methods described in the present disclosure is shown. As shown in FIG. 14, in some embodiments, computing device 1350 can include a processor 1402, a display 1404, one or more inputs 1406, one or more communication systems 1408, and/or memory 1410. In some embodiments, processor 1402 can be any suitable hardware processor or combination of processors, such as a central processing unit ("CPU"), a graphics processing unit ("GPU"), and so on. In some embodiments, display 1404 can include any suitable display devices, such as a computer monitor, a touchscreen, a television, and so on. In some embodiments, inputs 1406 can include any suitable input devices and/or sensors that can be used to receive user input, such as a keyboard, a mouse, a touchscreen, a microphone, and so on.

In some embodiments, communications systems 1408 can include any suitable hardware, firmware, and/or software for communicating information over communication network 1354 and/or any other suitable communication networks. For example, communications systems 1408 can include one or more transceivers, one or more communication chips and/or chip sets, and so on. In a more particular example, communications systems 1408 can include hardware, firmware and/or software that can be used to establish a Wi-Fi connection, a Bluetooth connection, a cellular connection, an Ethernet connection, and so on.

In some embodiments, memory 1410 can include any suitable storage device or devices that can be used to store instructions, values, data, or the like, that can be used, for example, by processor 1402 to present content using display 1404, to communicate with server 1352 via communications system(s) 1408, and so on. Memory 1410 can include any suitable volatile memory, non-volatile memory, storage, or any suitable combination thereof. For example, memory 1410 can include RAM, ROM, EEPROM, one or more flash drives, one or more hard disks, one or more solid state drives, one or more optical drives, and so on. In some embodiments, memory 1410 can have encoded thereon, or otherwise stored therein, a computer program for controlling operation of computing device 1350. In such embodiments, processor 1402 can execute at least a portion of the computer program to present content (e.g., images, user interfaces, graphics, tables), receive content from server 1352, transmit information to server 1352, and so on.

In some embodiments, server 1352 can include a processor 1412, a display 1414, one or more inputs 1416, one or more communications systems 1418, and/or memory 1420. In some embodiments, processor 1412 can be any suitable hardware processor or combination of processors, such as a CPU, a GPU, and so on. In some embodiments, display 1414 can include any suitable display devices, such as a computer monitor, a touchscreen, a television, and so on. In some embodiments, inputs 1416 can include any suitable input devices and/or sensors that can be used to receive user input, such as a keyboard, a mouse, a touchscreen, a microphone, and so on.

In some embodiments, communications systems 1418 can include any suitable hardware, firmware, and/or software for communicating information over communication network 1354 and/or any other suitable communication networks. For example, communications systems 1418 can include one or more transceivers, one or more communication chips and/or chip sets, and so on. In a more particular example, communications systems 1418 can include hardware, firmware and/or software that can be used to establish a Wi-Fi connection, a Bluetooth connection, a cellular connection, an Ethernet connection, and so on.

In some embodiments, memory 1420 can include any suitable storage device or devices that can be used to store instructions, values, data, or the like, that can be used, for example, by processor 1412 to present content using display 1414, to communicate with one or more computing devices 1350, and so on. Memory 1420 can include any suitable volatile memory, non-volatile memory, storage, or any suitable combination thereof. For example, memory 1420 can include RAM, ROM, EEPROM, one or more flash drives, one or more hard disks, one or more solid state drives, one or more optical drives, and so on. In some embodiments, memory 1420 can have encoded thereon a server program for controlling operation of server 1352. In such embodiments, processor 1412 can execute at least a portion of the server program to transmit information and/or content (e.g., data, images, a user interface) to one or more computing devices 1350, receive information and/or content from one or more computing devices 1350, receive instructions from one or more devices (e.g., a personal computer, a laptop computer, a tablet computer, a smartphone), and so on.

In some embodiments, image source 1302 can include a processor 1422, one or more image acquisition systems 1424, one or more communications systems 1426, and/or memory 1428. In some embodiments, processor 1422 can be any suitable hardware processor or combination of processors, such as a CPU, a GPU, and so on. In some embodiments, the one or more image acquisition systems 1424 are generally configured to acquire data, images, or both, and can include an ultrasound system. Additionally or alternatively, in some embodiments, one or more image acquisition systems 1424 can include any suitable hardware, firmware, and/or software for coupling to and/or controlling operations of an ultrasound system. In some embodiments, one or more portions of the one or more image acquisition systems 1424 can be removable and/or replaceable.

Note that, although not shown, image source 1302 can include any suitable inputs and/or outputs. For example, image source 1302 can include input devices and/or sensors that can be used to receive user input, such as a keyboard, a mouse, a touchscreen, a microphone, a trackpad, a trackball, and so on. As another example, image source 1302 can include any suitable display devices, such as a computer monitor, a touchscreen, a television, etc., one or more speakers, and so on.

In some embodiments, communications systems 1426 can include any suitable hardware, firmware, and/or software for communicating information to computing device 1350 (and, in some embodiments, over communication network 1354 and/or any other suitable communication networks). For example, communications systems 1426 can include one or more transceivers, one or more communication chips and/or chip sets, and so on. In a more particular example, communications systems 1426 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1428 can include any suitable storage device or devices that can be used to store instructions, values, data, or the like, that can be used, for example, by processor 1422 to control the one or more image acquisition systems 1424, and/or receive data from the one or more image acquisition systems 1424; to images from data; present content (e.g., images, a user interface) using a display; communicate with one or more computing devices 1350; and so on. Memory 1428 can include any suitable volatile memory, non-volatile memory, storage, or any suitable combination thereof. For example, memory 1428 can include RAM, ROM, EEPROM, one or more flash drives, one or more hard disks, one or more solid state drives, one or more optical drives, and so on. In some embodiments, memory 1428 can have encoded thereon, or otherwise stored therein, a program for controlling operation of image source 1302. In such embodiments, processor 1422 can execute at least a portion of the program to generate images, transmit information and/or content (e.g., data, images) to one or more computing devices 1350, receive information and/or content from one or more computing devices 1350, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for generating an image of microvasculature in a subject from ultrasound data, the method comprising:
    (a) accessing ultrasound data acquired from a subject with a computer system;
    (b) generating microbubble signal data by extracting microbubble signals from the ultrasound data using the computer system;
    (c) generating a plurality of subsets of microbubble signal data from the microbubble signal data using the computer system, wherein the plurality of subsets of microbubble signal data are generated by separating the microbubble signal data into subsets of microbubble signals based on acoustic properties of individual microbubbles, wherein the acoustic properties of individual microbubbles comprise at least one of intensities of the microbubbles or blinking behaviors of the microbubbles;
    (d) generating a microvessel image for each subset of microbubble signal data using the computer system, wherein each microvessel image represents a sparse subset of microbubble signals; and
    (e) generating a combined microvessel image based on a combination of the microvessel image for each of the plurality of subsets of microbubble signal data.

2. The method as recited in claim 1, wherein the plurality of subsets of microbubble signal data are further separated based on spatiotemporal hemodynamics of microbubbles.

3. The method as recited in claim 2, wherein the plurality of subsets of microbubble signal data are generated based on a matrix decomposition of the microbubble signal data.

4. The method as recited in claim 3, wherein the matrix decomposition is a singular value decomposition.

5. The method as recited in claim 4, wherein each of the plurality of subsets of microbubble signal data is generated by separating microbubble signal data into subsets each associated with a different range of singular values determined from the singular value decomposition of the microbubble signal data.

6. The method as recited in claim 5, wherein at least one temporal filter is applied to each subset of microbubble signal data in order to further separate microbubble signals into additional subsets based on different Doppler frequency bands in each subset of microbubble signal data.

7. The method as recited in claim 5, wherein the plurality of subsets of microbubble signal data are further separated by computing Doppler frequency components of each subset of microbubble signal data in order to further separate positive and negative Doppler frequency components in each subset of microbubble signal data into two additional subsets of microbubble signal data.

8. The method as recited in claim 3, wherein the matrix decomposition is an eigenvalue-based decomposition.

9. The method as recited in claim 2, wherein the plurality of subsets of microbubble signal data are generated based on a principal component analysis.

10. The method as recited in claim 2, wherein the plurality of subsets of microbubble signal data are generated by applying at least one temporal filter to the microbubble signal data in order to separate the microbubble signal data into the plurality of subsets of microbubble signal data each corresponding to a different Doppler frequency band.

11. The method as recited in claim 10, wherein the plurality of subsets of microbubble signal data are further separated by computing Doppler frequency components of each subset of microbubble signal data in order to further separate positive and negative Doppler frequency components in each subset of microbubble signal data into two additional subsets of microbubble signal data.

12. The method as recited in claim 2, wherein the plurality of subsets of microbubble signal data are generated by computing Doppler frequency components of the microbubble signal data and separating positive and negative Doppler frequency components into two subsets of microbubble signal data.

13. The method as recited in claim 2, wherein the plurality of subsets of microbubble signal data are generated by applying at least one spatial-temporal filter to the microbubble signal data in order to separate the microbubble signal data into the plurality of subsets of microbubble signal data based on microbubbles moving with different velocities and in different directions.

14. The method as recited in claim 1, wherein the plurality of subsets of microbubble signal data are generated by inputting the microbubble signal data to a trained machine learning algorithm, generating output as the plurality of subsets of microbubble signal data, wherein the trained machine learning algorithm is trained on training data in order to separate microbubble signals based on different microbubble properties.

15. The method as recited in claim 14, wherein the trained machine learning algorithm implements a neural network.

16. The method as recited in claim 1, wherein the combined microvessel image is generated by combining each microvessel image based on an average of each microvessel image.

17. The method as recited in claim 16, wherein the average is a weighted average.

18. The method as recited in claim 1, wherein the ultrasound data are ultrasound data having been acquired with an ultrasound system from a region-of-interest in the subject in which a microbubble contrast agent was present when the ultrasound data were acquired.

19. The method as recited in claim 1, wherein extracting the microbubble signals from the ultrasound data comprises isolating microbubble signals in the ultrasound data from other signals in the ultrasound data.

20. The method as recited in claim 1, wherein generating the microvessel image for each subset of microbubble signal data comprises:
localizing microbubble signals in each subset of microbubble signal data by determining spatial locations associated with microbubbles in each subset of microbubble signal data using the computer system; and
generating each microvessel image based at least in part on the localized microbubble signals.

21. The method as recited in claim 20, wherein generating the microvessel image for each subset of microbubble signal data further comprises tracking microbubbles as a function of time based on the localized microbubble signals and generating the microvessel image based on that tracking of the microbubbles.

22. The method as recited in claim 1, wherein the combined microvessel image comprises an accumulated microbubble location map that depicts a number of times that a microbubble appeared at a given location.

23. The method as recited in claim 1, wherein the combined microvessel image depicts morphological measurements of a microvessel in the subject, wherein the morphological measurements comprise at least one of vessel density or vessel tortuosity.

24. The method as recited in claim 1, wherein the microvessel image depicts hemodynamics measurements of a microvessel in the subject, wherein the hemodynamics measurements comprise at least one of blood flow speed, perfusion indices derived from blood flow speed, and cross-sectional blood flow volume rate.

25. The method as recited in claim 13, wherein the plurality of subsets of microbubble signal data are further separated by computing Doppler frequency components of each subset of microbubble signal data in order to further separate positive and negative Doppler frequency components in each subset of microbubble signal data into two additional subsets of microbubble signal data.

26. The method as recited in claim 1, wherein the acoustic properties of individual microbubbles comprise at least one of linear frequency response to sonifying ultrasound, non-linear frequency response to sonifying ultrasound, or resonance frequencies of the individual microbubbles.

* * * * *